US010732280B1

(12) United States Patent
DeSalvo et al.

(10) Patent No.: US 10,732,280 B1
(45) Date of Patent: Aug. 4, 2020

(54) OPTICAL SENSOR FOR MEASURING DISPLACEMENT OF A HAPTIC PLATE

(71) Applicant: Facebook Technologies, LLC, Menlo Park, CA (US)

(72) Inventors: Riccardo DeSalvo, Pasadena, CA (US); Ian Andreas Marquez, Whittier, CA (US); Jeff Jakkit Ongnok, Farmington, MI (US)

(73) Assignee: Facebook Technologies, LLC, Menlo Park, CA (US)

( * ) Notice: Subject to any disclaimer, the term of this patent is extended or adjusted under 35 U.S.C. 154(b) by 0 days.

(21) Appl. No.: 16/655,143

(22) Filed: Oct. 16, 2019

Related U.S. Application Data

(63) Continuation of application No. 15/788,608, filed on Oct. 19, 2017, now Pat. No. 10,481,262.

(51) Int. Cl.
*G01S 17/08* (2006.01)
*G06T 19/00* (2011.01)
*G06F 3/01* (2006.01)
*G01H 9/00* (2006.01)

(52) U.S. Cl.
CPC ............... *G01S 17/08* (2013.01); *G01H 9/00* (2013.01); *G06F 3/016* (2013.01); *G06T 19/006* (2013.01)

(58) Field of Classification Search
CPC ........ G06F 3/011; G06F 3/016; G06F 3/0304; G06F 3/0325; G06F 3/0338; A63F 13/285; A63F 13/5255; G01H 9/00; G01S 17/08; G06T 19/006
USPC ............................................. 250/221, 214 R
See application file for complete search history.

(56) References Cited

U.S. PATENT DOCUMENTS 8,059,105 B2 * 11/2011 Rosenberg ............ G06F 3/0362
345/173
9,176,583 B2   11/2015 Droulin et al.

* cited by examiner

*Primary Examiner* — Que Tan Le
(74) *Attorney, Agent, or Firm* — Fenwick & West LLP

(57) ABSTRACT

An optical sensor measures displacement of a haptic plate that provides haptic sensation to a user. The optical sensor comprises a light source, a plurality of optical detectors, and a controller. The light source is configured to illuminate a surface of the haptic plate in which a haptic wave propagates causing displacement of portions of the haptic plate in one or more directions. The plurality of optical detectors is configured to detect light reflected from the surface of the haptic plate. At least two optical detectors of the plurality of optical detectors are positioned relative to the light source such that an amount of light received at each of the optical detectors is based at least in part on a direction of displacement of the haptic plate. The controller is configured to monitor the haptic wave using the detected light from the plurality of optical detectors.

20 Claims, 8 Drawing Sheets

US 10,732,280 B1

OPTICAL SENSOR FOR MEASURING DISPLACEMENT OF A HAPTIC PLATE

CROSS REFERENCE TO RELATED APPLICATIONS

This application is a continuation of U.S. application Ser. No. 15/788,608, filed Oct. 19, 2017, which is incorporated by reference in its entirety.

BACKGROUND

The present disclosure generally relates to a system for providing haptic sensation to a user, and specifically to a sensor, which measures displacement of a haptic plate or membrane.

A conventional virtual reality (VR) system includes a headset that provides visual and audio information to the user. Additionally, in some instances, a VR system may also include some type of haptic device that provides haptic sensation to a user. For example, a VR system may have a matrix of actuators that vibrates to provide some type of localized indication to a user of the VR system. A large number of distributed actuators are needed to deliver haptic sensations over extended surfaces. This number grows with the square of the linear size. A system with one or more rows of actuators distributed around the perimeter of a thin metal surface has been demonstrated to be able to deliver haptic sensations in desired positions on the thin plate or membrane by sending waves that interfere, constructively or destructively, to generate the desired haptic sensation spatial profile. In this arrangement the actuator number required is only proportional to the linear size of the device, not its square. For example, a system with 64 perimeter actuators may require 400 actuators to achieve the same haptic sensation spatial definition over the same surface. The gain grows higher as larger device sizes are considered. Haptic devices need to account for dispersion of a vibrational wave as it passes through the haptic device plate, to avoid delivering inconsistent haptic experiences to the user.

SUMMARY

An optical sensor is configured to monitor deflection of an object (e.g., a haptic plate). The optical sensor includes a light source, a plurality of optical detectors (e.g., photodiodes), surrounding a LED light source. The light source configured to illuminate a surface of the object in which a haptic wave propagates. The propagating haptic wave causes displacement of portions of the surface. The plurality of optical detectors are configured to detect light reflected from the surface of the object and from that gauge the changing object distance, at least two of the plurality of optical detectors are positioned relative to the light source such that an amount of light received at each of the optical detectors is based at least in part on tilt of the object. The controller is configured to monitor the haptic wave using the detected light.

In some embodiments, one or more optical sensors are part of a haptic device that includes a haptic plate. A haptic device augments an artificial reality experience. The haptic device can generate feedback vibrations to a user simulating virtual impulses in contact with the user. For example, the haptic device may be configured to act as a haptic mat on which a user might stand, or a haptic mat that a user may place their hand. The haptic device may be part of a head-mounted display (HMD) system, and through the haptic device, the HMD system can generate vibrational haptic sensation to the user. This can be useful for simulating situations in an artificial reality experience which may correspond to, e.g., movement in a virtual ground beneath the user's feet. The displacement of the haptic device is monitored using one or more optical sensors that monitor deflections in a haptic plate of the haptic device.

DETAILED DESCRIPTION

Figure 1:
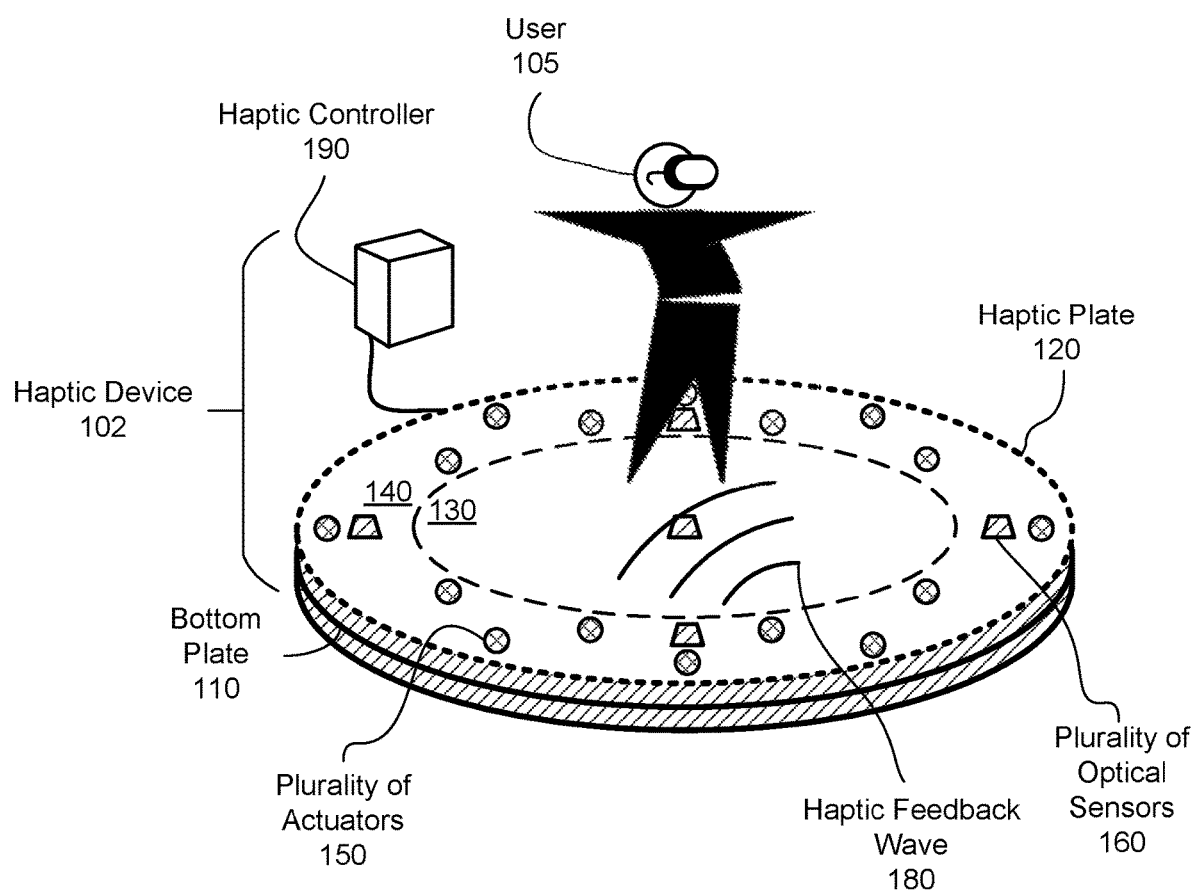
FIG. 1 is a perspective view of a haptic device, in accordance with an embodiment.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic sensation, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

A haptic device augments an artificial reality experience. The haptic device provides haptic sensation to a user. The haptic device includes a haptic plate and a plurality of actuators. The haptic plate comprises a center portion and an outer portion, which circumscribes the center portion. The outer portion is coupled to a plurality of actuators. One or more of the actuators are for generation of a haptic wave, and in some embodiments some (or all) of the actuators may be used for damping the haptic wave so as to prevent reflection of the wave. The haptic wave is generated in accordance with haptic instructions (e.g., from a console of an HMD system). The haptic wave is such that it converges to a specific waveform at a specific region of the center portion of the plate. And a shape of the specific waveform and a location of the specific region on the center portion of the haptic plate are based in part on the haptic instructions.

An optical sensor includes a light source, a plurality of optical detectors (e.g., optical detectors), and a controller. The light source is configured to illuminate a surface of the object in which a haptic wave propagates. The propagating haptic wave causes displacement in portions of the surface in one or more directions. The plurality of optical detectors are configured to detect light reflected from the surface of the object. At least two of the plurality of optical detectors are positioned relative to the light source such that an amount of light received at each of the optical detectors is based at least in part on a direction of displacement of the object. The controller is configured to monitor the haptic wave using the detected light. There is an amount of reflected light captured by each of the optical detectors. As the object is displaced the amount of reflected light in one or more of the optical detectors changes. Accordingly, the controller can determine an amount of displacement over a particular time interval based on the amount of reflected light captured in each of the plurality of optical sensors at that time interval.

In some embodiments, the optical sensor may be part of a haptic device, and used to monitor deflection of a haptic plate of the haptic device. As noted above, the optical sensor determines displacement of a surface using reflected light intensity that is incident on a plurality of optical detectors. The haptic device may use the determined displacement in generation and/or damping of haptic waves.

FIG. 1 is a perspective view 100 of a haptic device 102, in accordance with an embodiment. The perspective view 100 includes a user 105 standing on the haptic device 102. The haptic device 102 comprises a bottom plate 110, a haptic plate 120, a plurality of actuators 150, a plurality of optical sensors 160, and a haptic controller 190. The haptic plate 120 comprises a center portion 130 and an outer portion 140. In this embodiment, coupled between the bottom rigid plate 110 and the haptic plate 120 are the plurality of actuators 150 and the plurality of optical sensors 160, in accordance with an embodiment. In alternate embodiments, some or all of the plurality of actuators 150 and/or some or all of the plurality of optical sensors 160 are coupled to a top surface of the haptic plate 120.

The bottom plate 110 mounts the plurality of actuators 150 and the plurality of optical sensors 160 of the haptic device 102, in accordance with an embodiment. The bottom plate 110 is composed of a rigid material, in accordance with an embodiment. For example, the bottom plate 110 is composed of aluminum, steel, stainless steel, some other metal, some other stiff material, or some combination thereof. In some embodiments, the bottom plate 110 is coated in certain regions with an absorptive coating (e.g., black paint) so as to reduce optical noise for the optical sensors 160. In some instances, the bottom plate 110 is thicker than the haptic plate 120. The bottom plate 110 is of a same shape as the haptic plate 120, in accordance with an embodiment. For example, the bottom plate 110 and the haptic plate 120 are both circular. In other embodiments, the shape and size of the bottom plate 110 differs, e.g., the thickness of the bottom plate 110 is two centimeters and/or the diameter of the bottom plate 110 is one meter.

The haptic plate 120 comprises a center portion 130 and an outer portion 140 which circumscribes the center portion 130. The center portion 130 and the outer portion 140 of the haptic plate may have a circular, elliptical, or some other shape useful for transmitting haptic sensation. The center portion 130 may include one or more optical sensors 160 coupled to the center portion 130 of the haptic plate 120, in accordance with this embodiment. In this embodiment, the outer portion 140 includes a plurality of actuators 150 and a plurality of optical sensors 160. In other embodiments, the haptic device 102 includes additional/fewer actuators 150 and/or optical sensors 160 than shown in this illustration.

The haptic plate 120 is a medium through which haptic sensation is provided to the user 105. The haptic plate 120 is composed of a rigid material to support wave propagation, in accordance with an embodiment. For example, the haptic plate 120 is composed of aluminum, steel, stainless steel, some other metal, some other stiff material, or some combination thereof. In other embodiments, the haptic plate 120 is composed of a rigid material of a certain stiffness so as to allow wave propagation in the haptic plate 120 while a boundary ring is composed of a material of a lesser stiffness than the rigid material so as to damp other waves from reflecting off the boundary of the haptic plate 120. For example, the center portion 130 is a rigid metal to allow wave propagation around where the user 105 would stand while a boundary ring is a polymer material that reduces wave reflection from the boundary of the haptic plate 120. In other embodiments, the dimensions of the haptic plate 120 differ, e.g., the thickness of the haptic plate 120 is five millimeters and/or the diameter of the haptic plate 120 is one meter. A surface of the haptic plate 120 may include one or more reflective areas that reflect light emitted by an optical sensor (e.g., of the plurality of optical sensors 160). In some embodiments, one or more portions of the haptic plate 120 outside of the one or more reflective areas are coated with an absorptive coating. The absorptive coating helps prevent stray light and may increase the signal-to-noise ratio for some or all of the plurality of optical sensors 160.

The plurality of actuators 150 is configured to control haptic waves 180 in the haptic plate 120. The plurality of actuators 150 is coupled to the bottom plate 110 and the haptic plate 120 around the outer portion 140. In accordance with an embodiment, the actuators 150 are configured as two rings of actuators 150 which are concentric and of different diameters such that the two rings do not coincide. In other embodiments, the actuators 150 are configured as a plurality of rings of actuators 150 which are concentric and of varying diameters. There are eight actuators on each ring of actuators which are equally spaced around the ring, in accordance with an embodiment. In accordance with an embodiment, the actuators of a first ring are offset or staggered from the actuators of a second ring, such that any actuator of the first ring and any actuator of the second ring are not collinear with the rings' center. In other embodiments, the actuators of the first ring and the actuators of the second ring are inline radially with the haptic plate 120. In other embodiments, the haptic device 102 comprises of additional or fewer actuators 150 in various positions of the outer portion 140 of the haptic plate 120. The plurality of actuators 150 control the haptic waves 180. Controlling the haptic waves 180 comprises generation of the haptic wave 180 and damping of the haptic wave 180, in accordance with some embodiments. The function of the plurality of actuators 150 will be discussed in detail in conjunction with FIG. 2 and FIG. 3.

The optical sensors 160 are configured to monitor displacement of the haptic plate 120 in various positions on the haptic plate 120. There are one or more optical sensors 160 that are evenly spaced around the outer portion 140 of the haptic plate 120, in accordance with an embodiment. There can also be one or more optical sensors 160 coupled to the center portion 130 of the haptic plate 120, in accordance with an embodiment. The optical sensors 160 utilize a light source and a set of optical detectors to determine displacement in the haptic plate 120 up to six degrees of freedom (three translational and three rotational). The optical sensor 160 records the displacement of the haptic plate 120 as translation data. In other embodiments, the haptic device 102 comprises of additional or fewer optical sensors 160 in various positions of the haptic plate 120. Embodiments of the optical sensors 160 will be further described in detail with regard to FIG. 4A, FIG. 4B and FIG. 5.

The haptic controller 190 coordinates actuation of the actuators 150 to provide the haptic sensation to the user 105. The haptic controller 190 receives haptic instructions comprising a location, an impulse waveform, and an impulse timing of a haptic wave 180, in accordance with an embodiment. The haptic controller 190 determines from the haptic instructions a set of at least one actuator to generate a haptic wave 180. Within the set of at least one actuator to be actuated, the haptic controller 190 determines a waveform for each actuator to generate and a point in time for each actuator to actuate. The timing precision is important to achieve convergence of all the waveforms to create the desired haptic wave 180 specified in the haptic instructions.

The haptic controller 190 also collects translation data measured by the optical sensors 160 for monitoring the propagation of the haptic waves 180 generated by the actuators 150. The haptic controller 190 receives damping instructions comprising information on the amount of damping to be done by a set of actuators. The amount of damping for the haptic waves 180 is based at least in part on the translation data from the optical sensors 160 as the haptic waves 180 are propagating along the center portion 130 of the haptic plate 120. The damping instructions may further comprise timing precision for each actuator of the set of actuators configured to damp the haptic waves 180. In some embodiments, the haptic controller 190 determines damping instructions based on the translation data. The haptic controller 190 can also utilize the translation data from the optical sensors 160 to adjust the actuators 150 for other wavefronts. For example, if multiple users of varying weight and/or strength take turns utilizing the haptic device 102, the translation data can help calibrate the haptic waves 180 for each user. While the haptic controller 190 controls the actuators 150 and the optical sensors 160, in accordance with an embodiment, in other embodiments the haptic controller 190 controls additional or fewer components of the haptic device 102.

In one embodiment, the haptic controller 190 communicates with the plurality of actuators 150 and the plurality of optical sensors 160 through a wireless connection, e.g., a Bluetooth connection, a Wi-Fi connection, or some other wireless connection. In other embodiments, the haptic controller 190 is coupled to the haptic device 102 and communicates with the plurality of actuators 150 and the plurality of optical sensors by a wired connection.

Figure 2:
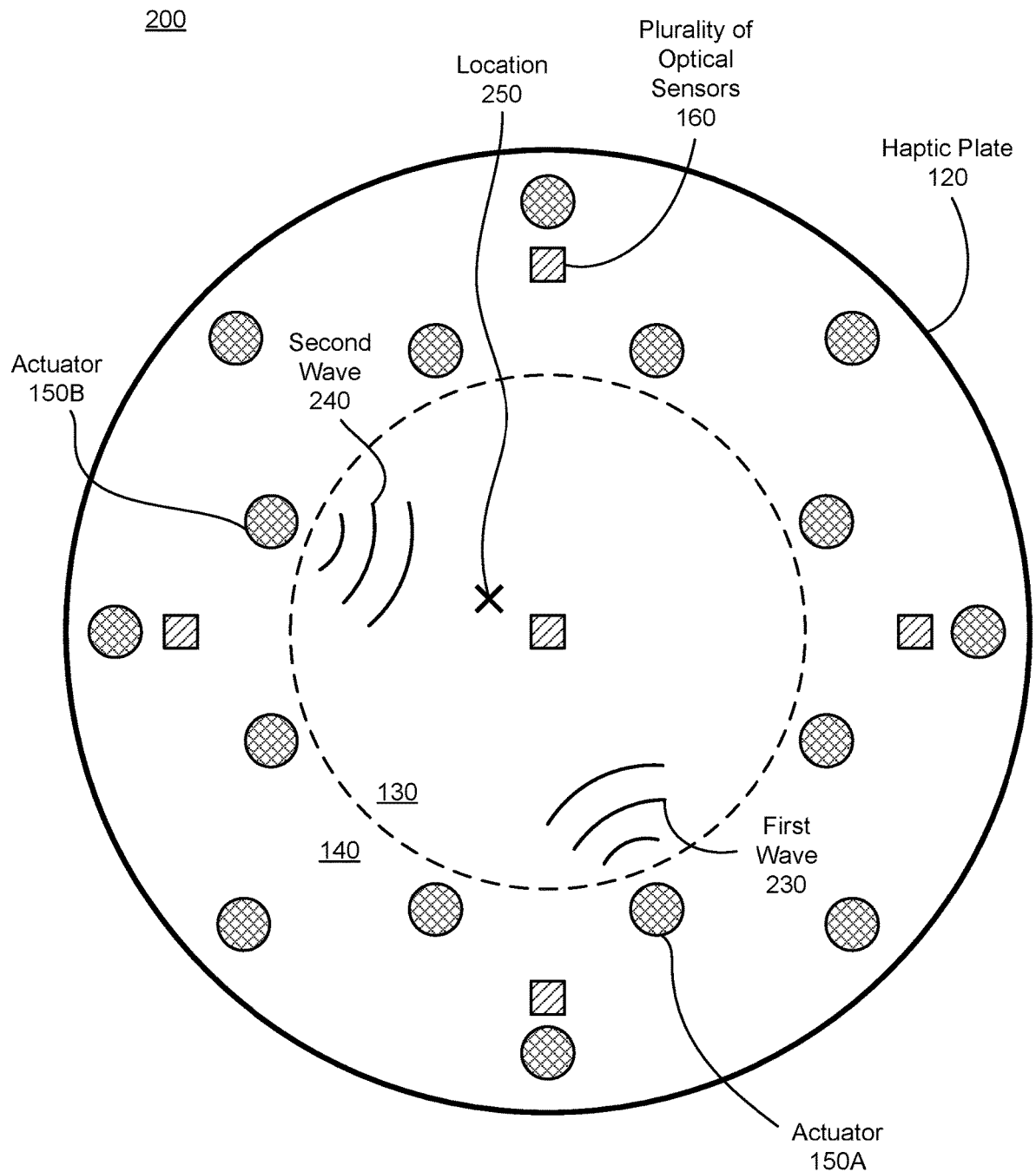
FIG. 2 is a bottom plan view of a portion of the haptic device of FIG. 1, in accordance with an embodiment.

FIG. 2 is a bottom plan view 200 of a portion of the haptic device 102 of FIG. 1, in accordance with an embodiment. The haptic plate 120 includes the center portion 130 and the outer portion 140. The two actuators 150A and 150B are configured to generate a haptic wave 180 in the center portion 130 of the haptic plate 120. The actuator 150A generates a first wave 230 with a first waveform. The actuator 150B generates a second wave 240 with a second waveform. The first wave 230 and the second wave 240 converge at a location 250 of the center portion 130 of the haptic plate 120 to form a target haptic waveform (e.g., the haptic wave 180). The configuration, operation, and composition of the haptic plate 120 including the center portion 130 and the outer portion 140, the actuators 150, the optical sensors 160, and the haptic wave 180 are described in FIG. 1; therefore, the detailed description thereof is omitted herein for the sake of brevity.

In some embodiments, the haptic device 102 generates haptic sensation via wave field synthesis. Huygens' Principle proposes that a singular wavefront can be thought of as a distribution of point sources, whose radial emission of energy through superposition overlay to exactly that wavefront. Using this idea, the haptic device 102 generates waves of a particular frequency and a particular magnitude by driving one or more actuators of the plurality of actuators 150 with a specific phase delay (e.g., depending on array geometry of the one or more actuators). The waves generated by a subset of the plurality of actuators 150 with differing phase delays superimpose to any position on the center portion 130 with a range of waveforms for the haptic wave 180. The specific phase delays for each actuator of a subset of actuators selected to generate the haptic wave 180 depend in part on the composition and the dimensions of the haptic plate 120. In some embodiments, the composition and the dimensions of the haptic plate involve considering the composition and the dimensions of both the center portion 130 and the outer portion 140. Understanding the material density and the thickness of the haptic plate 120 determines a speed of wave propagation. The specific phase delays depend in part on the speed of the haptic waves 180 propagating along the center portion 130 of the haptic plate 120.

The location 250 of the haptic wave 180 is a determined coordinate on the center portion 130 of the haptic plate 120 for a virtual haptic event. An actuator 150B has coordinates closer in proximity to coordinates of the location 250 than an actuator 150A, in accordance with an example embodiment. In this embodiment, to achieve a target haptic wave at the location 250 with the target haptic waveform while actuating actuator 150A and actuator 150B, the actuators 150A and 150 B may be actuated differently. For example, amplitude, frequency, timing, other parameters that affect generation of a haptic wave, or some combination thereof, may be different in the actuator 150A and the actuator 150B. For example, the actuator 150A may actuate first, generating a first wave 230 with a first waveform at an initial time. And the actuator 150B may actuate after a specific time delay, generating a second wave 240 with a second waveform. For example, the actuator 150A is actuated generating the first wave 230 with a relative magnitude of '8' out of '10' at an initial time. Then the actuator 150B is actuated generating the second wave 240 with another relative magnitude of '3' out of '10' following a time delay of fifteen milliseconds after the initial time. The two waves generated by actuator 150A and actuator 150B converge at the location 250 as the target haptic wave. The target haptic wave has a superimposed magnitude and a frequency. The superimposed magnitude depends at least in part on the magnitudes of the two waves. The frequency depends at least in part on the specific time delay, the first waveform, the material of the haptic plate 120, and the second waveform. This is a representative example of Huygens' Principle regarding wave superposition. The example illustrated herein utilizes two actuators 150A and 150B of the plurality of actuators 150; however, in other embodiments, any number of actuators of the plurality of actuators 150 can be actuated to achieve the haptic wave 180 at the location 250. In other embodiments, the actuators selected from the plurality of actuators 150 to generate the haptic wave 180 can be configured to generate the same waveform comprising the same amplitude and the same frequency.

Figure 3:
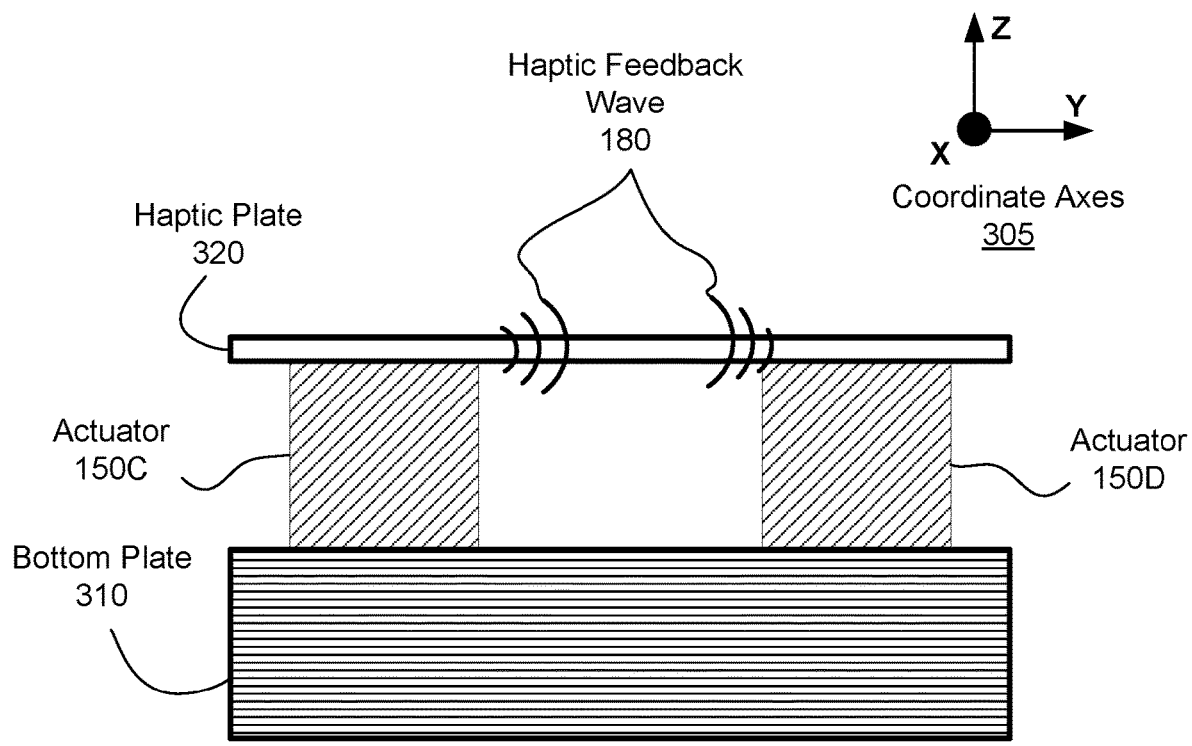
FIG. 3 is a cross sectional view of a portion of the haptic device of FIG. 1, in accordance with an embodiment.

FIG. 3 is a cross sectional view 300 of a portion of the haptic device 102 of FIG. 1, in accordance with an embodiment. The portion of the haptic device 102 includes a bottom plate 310 referring to a portion of the bottom plate 110, a haptic plate 320 referring to a portion of the haptic plate 120, and two actuators 150C and 150D, in accordance with an embodiment. The actuator 150C on the left is configured to generate a haptic wave 180. The actuator 150D on the right is configured to damp the haptic wave 180. The orthogonal axes 305 portray the x-axis and y-axis as in-plane with the haptic plate 120 and the z-axis as depth of the haptic device 102.

In one embodiment, the plurality of actuators 150 has limited movement within 1 degree of freedom. For example, the actuators 150 may move up/down. The actuators 150 comprise a conductive coil, a plate magnet, and a variable subtractive resistor, in accordance with an embodiment. The conductive coil is coupled to the bottom plate 310 and the plate magnet is coupled to the haptic plate 320. In one aspect, one or more actuators generate the haptic wave 180. In this illustration, the actuator 150C is electrically actuated by running a current through the conductive coil. The conductive coil creates a magnetic field which applies a magnetic force on the plate magnet to induce translation of the haptic plate 320 in the z-axis. In another aspect, one or more actuators of the plurality of actuators 150 damp the haptic wave 180. The one or more actuators adjust the variable subtractive resistor so as to tune an electrical resistance of the conductive coil. As the plate magnet translates with a haptic wave 180, the plate magnet induces a damping current in the conductive coil. The strength of the damping current depends in part on the electrical resistance of the conductive coil. The damping current creates a magnetic field that opposes the translation of the plate magnet, thus damping the haptic wave 180. The tunable resistance allows for a range of damping by the one or more actuators configured for damping. In this illustration, the actuator 150D adjust the variable subtractive resistor so as to tune damping of the haptic wave 180. In other embodiments, a subset of the actuators can be configured to generate the haptic wave 180 with another subset of the actuators configured to dampen the haptic wave 180. In other embodiments, the actuators 150 generate haptic waves 180 on the haptic plate 320 through other mechanical actuations.

Figure 4A:
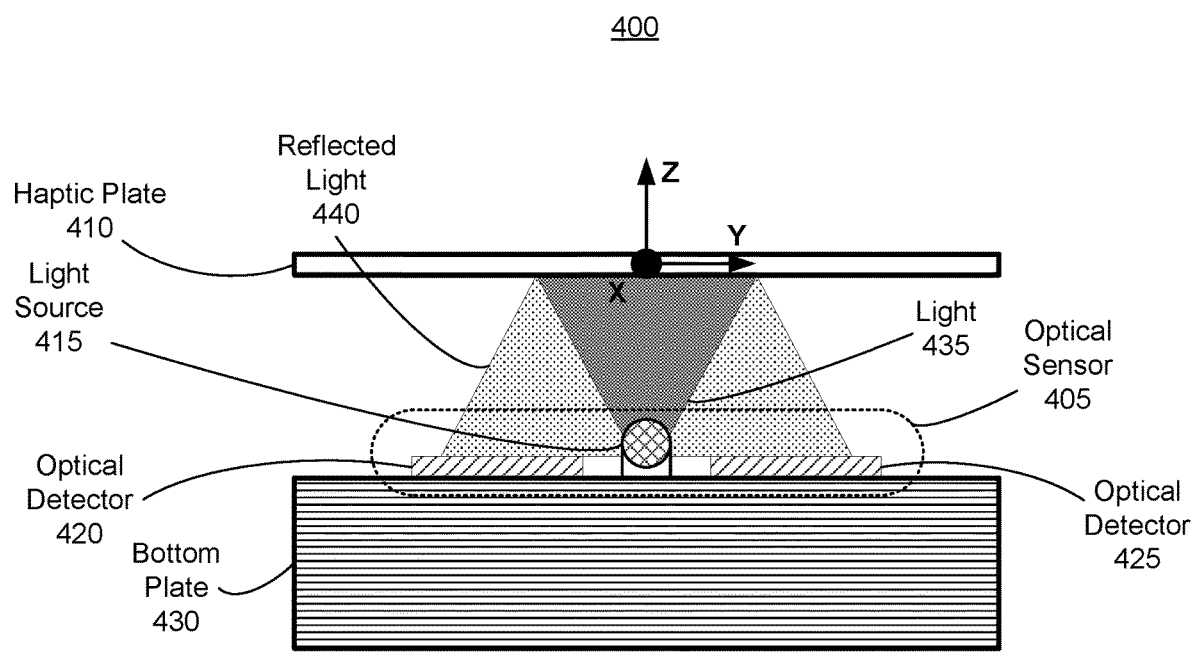
FIG. 4A is a cross sectional view of an optical sensor of FIG. 1 and a portion of a haptic plate in an unperturbed state, in accordance with an embodiment.

FIG. 4A is a cross sectional view 400 of an optical sensor 405 of FIG. 1 and a portion of a haptic plate 410 (henceforth referred to as the haptic plate 410) in an unperturbed state, in accordance with an embodiment. The haptic plate 410 is an embodiment of a portion of the haptic plate 120. The optical sensor 405 is an embodiment of one of the optical sensors 160 describe above with reference to FIG. 1. The optical sensor 405 includes a light source 415, a plurality of optical detectors (e.g., an optical detector 420 and an optical detector 425), and a controller (not shown). In some embodiments, the controller is the haptic controller 190 of the haptic device 102 where the haptic controller 190 determines translation data.

The light source 415 and optical detectors 420 and 425 are mounted on a portion of a bottom plate 430 (henceforth referred to as the bottom plate 430) of a haptic device. The portion of the bottom plate 430 may be, e.g., a portion of the bottom plate 110. In the unperturbed state, the haptic plate 410 is bisected by the x-y plane and the optical detectors 420 and 435 are parallel to the haptic plate 410, in accordance with an embodiment.

The light source 415 is configured to emit light 435 towards an underside of the haptic plate 410. The underside is at least partially reflective to the light 435. For example, the underside of the haptic plate 410 can be a polished metallic surface configured to reflect the light 435 as reflected light 440. In some embodiments, the underside of the haptic plate 410 has a plurality of reflective surfaces that each reflect light from a corresponding light source 415. And in some embodiments, one or more portions of the underside of the haptic plate 410 that are outside of the one or more reflective areas are coated with an absorptive coating. The absorptive coating helps prevent stray light and may increase the signal-to-noise ratio for some or all of the optical sensors. The light source 415 is one or more light emitters that emit infrared light, visible light, or some combination thereof. In some embodiments, the light source 415 can adjust an intensity of the light 435. A light emitter may be, e.g., a light emitting diode (LED), an organic LED, a microLED, a laser, some other light source, or some combination thereof.

The optical detectors 420 and 425 are positioned on both sides of the light source 415 and configured to measure the intensity of different portions of the reflected light 440. In some embodiments, the optical detectors 420 and 425 are positioned equidistant to the light source 415. In alternate embodiments, the optical detectors 420 and 425 are positioned at different distances from the light source 415. An optical detector is configured to detect optical light in a band emitted by the light source 415. The optical detector may be, e.g., a photodetector, a photodiode, a charge coupled device (CCD) sensor, a complementary metal-oxide-semiconductor (CMOS) sensor, some other sensor that can detect light in the band emitted by the light source 415, or some combination thereof. In preferred embodiments, an optical detector is a single pixel sensor (e.g., a photodiode), however, in alternate embodiments, a single optical detector may include an array of single pixel sensors. In some embodiments, an optical detector may include a filter that attenuates light outside of the band emitted by the light source 415.

Different portions of the reflected light 440 reflect off the haptic plate 410 to the optical detectors 420 and 425. In this example, the haptic plate 410 is parallel to the optical detectors 420 and 425, and different portions of the reflected light 440 are captured at each of the optical detectors 420 and 425. In embodiments where the optical detectors 420 and 425 are equidistant from the light source 415, the intensity of the portions of reflected light 440 measured by optical detectors 420 and 425 are substantially equal.

The haptic plate 410 moves in space in accordance with a propagation of a haptic wave and/or actions of the user. For example, the haptic plate 410 may move in up to 6 degrees of freedom such that a distance between portions of the haptic plate 410 and one or both of the optical detectors 420 and 425 can be measured. A change in distance between the haptic plate 410 and the bottom plate 430 influences an amount of the reflected light 440 detected by at least one of the optical detectors. The controller determines a displacement of the haptic plate 410 based in part on light measured by the two optical detectors 420 and 425. For example, if the haptic plate 410 is displaced such that distances change between the haptic plate 410 and one or both of the optical detectors 420 and 425, the amount of light detected by one or more optical detector changes.

A model maps light values at each of the plurality of optical detectors (e.g., the optical detectors 420 and 425) to specific positions of the haptic plate 410. Accordingly, the controller can use the model to determine a position of the haptic plate 410 given light measurements from the plurality of optical detectors. Moreover, the controller may determine a displacement of the haptic plate 410 from its previous position. In alternate embodiments, the controller may calculate on-the-fly (e.g., using a ray tracing algorithm) a displacement of the haptic plate 410 based in part on the light detected at each of the optical detectors.

In one embodiment, the optical sensor 405 can be calibrated by measuring portions of the reflected light 440 detected by each optical detector 420 and 425 at a plurality of known positions (e.g., angles and/or distances between the haptic plate 410 and the plurality of optical detectors) of the haptic plate 410. The controller updates the model with values corresponding to the various amounts of detected light for each of the plurality of optical sensors at each of the different positions of the haptic plate 410.

Figure 4B:
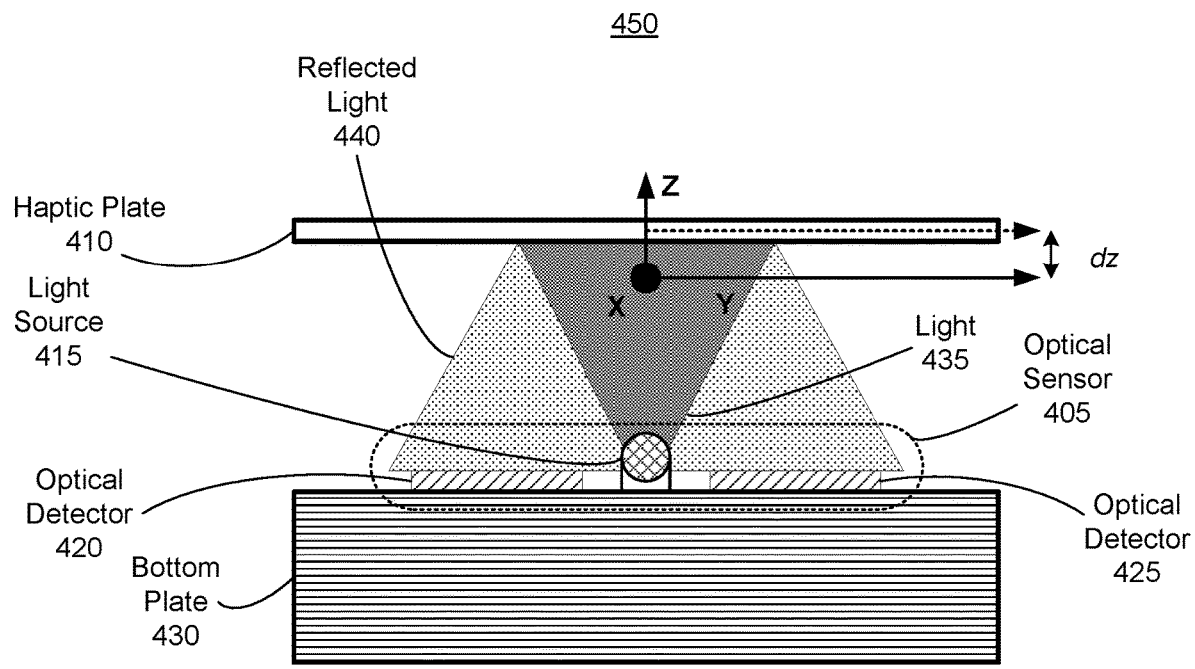
FIG. 4B is a cross sectional view of FIG. 4A with the haptic plate and change of illumination generated in a translated position, in accordance with an embodiment.

FIG. 4B is a cross sectional view 450 of FIG. 4A with the haptic plate 410 and change of illumination generated in a translated position, in accordance with an embodiment. As the haptic plate 410 is displaced along the z-axis, amounts of the reflected light 440 captured by the optical sensors 420 and 425 is different from the amounts of light captured above in FIG. 4A. The amount of light changes because the haptic plate 410 is farther away from the light source 415 and the optical detectors 420 and 425. The displacement in the positive z-axis causes light 435 from the light source 415 to travel an additional distance dz prior to being reflected; likewise, the displacement in the positive z-axis causes reflected light 440 from the underside of the haptic plate 120 to travel an additional distance dz prior to being detected by the optical detectors 420 and 425. The change in the amount of light captured by the optical detectors 420 and 425 is used to determine the displacement dz of the haptic plate 120 along the positive z-axis.

Figure 4C:
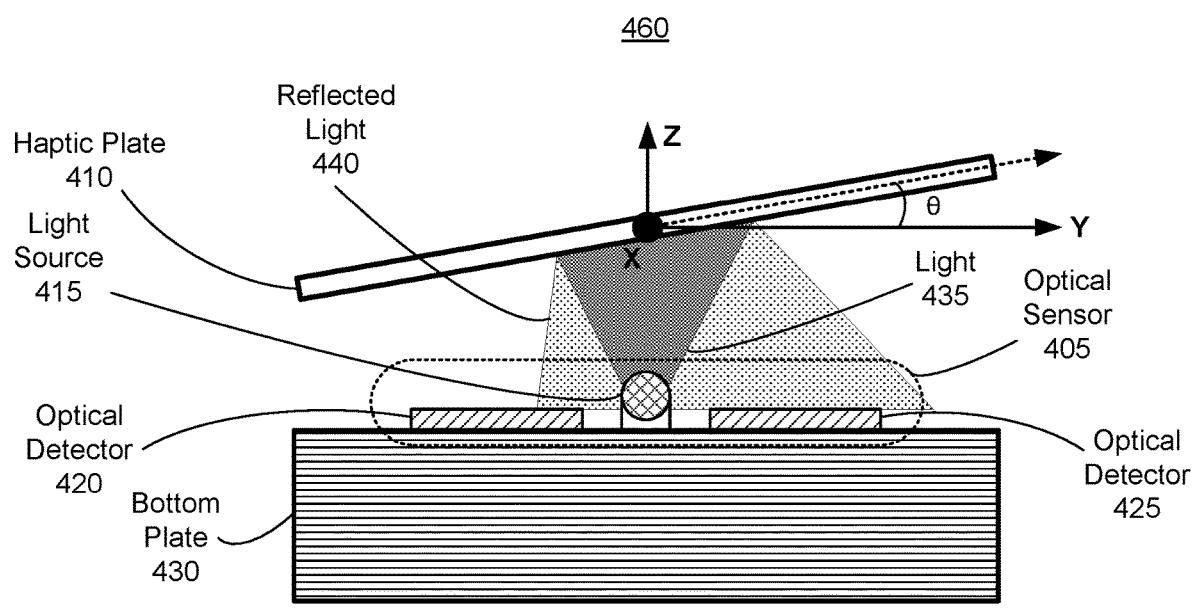
FIG. 4C is a cross sectional view of FIG. 4A with the haptic plate and change of illumination generated in a tilted position, in accordance with an embodiment.

FIG. 4C is a cross sectional view 460 of FIG. 4A with the haptic plate 410 and change in illumination generated in a tilted position, in accordance with an embodiment. A rotational pivot is along the x-axis at an origin of the coordinate axes. As the haptic plate 410 is tilted with respect to the x-axis by an angle θ, amounts of the reflected light 440 captured by the optical sensors 420 and 425 is different from the amounts of light captured above in FIG. 4A. The amount of light changes because there is a rotation of the haptic plate 410 causing light 435 from the light source 415 to reflect at different angles from the underside of the haptic plate 410. The change in the amount of light captured by the optical detectors 420 and 425 is used to determine the displacement of the haptic plate 120.

Figure 5:
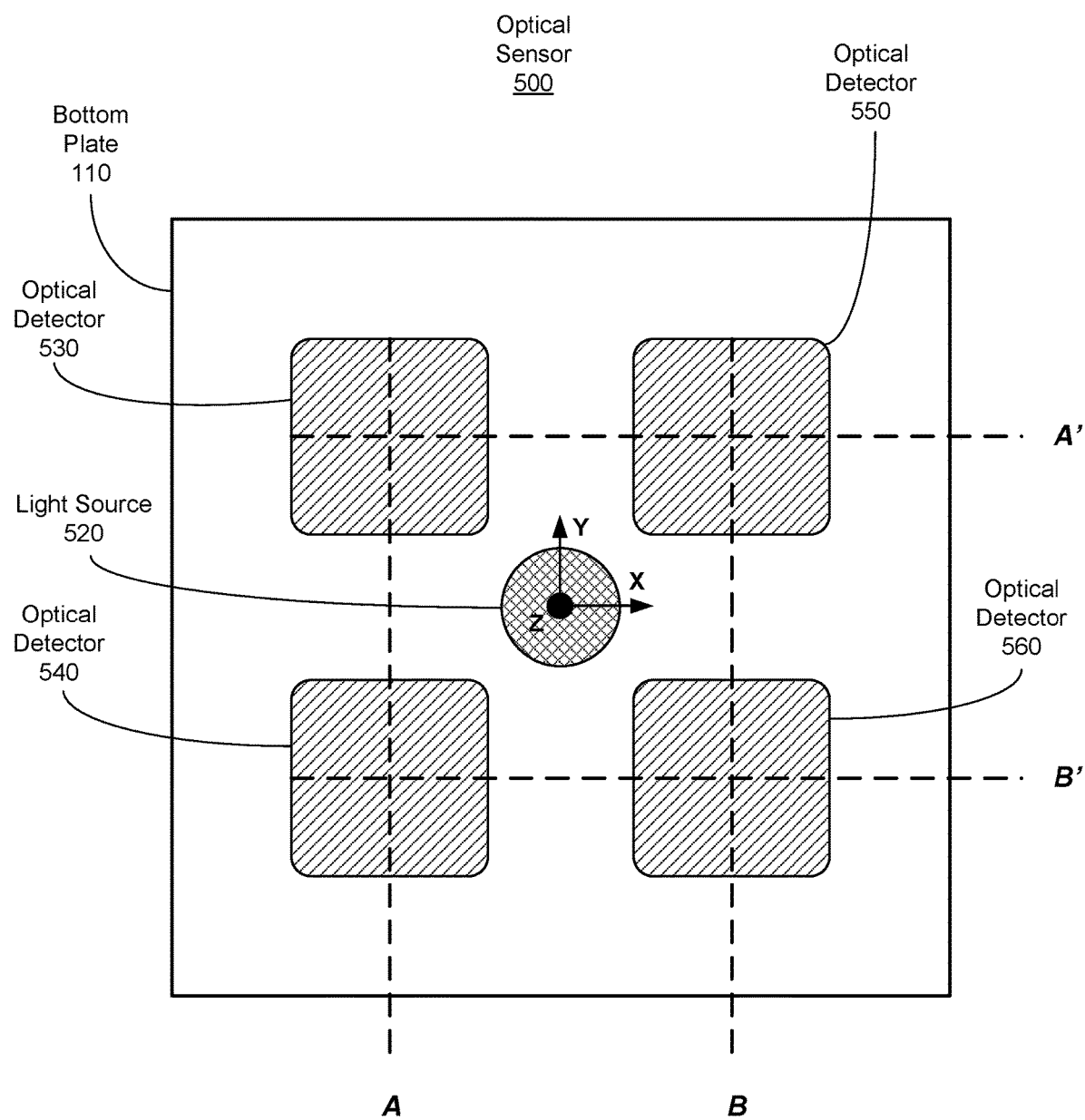
FIG. 5 is a top plan view of an optical sensor, in accordance with an embodiment.

FIG. 5 is a top plan view of an optical sensor 500, in accordance with an embodiment. The optical sensor 500 is an embodiment of one of the optical sensors 160 discussed above with reference to FIG. 1. The optical sensor 500 includes a light source 520 and optical detectors 530, 540, 550, and 560, and a controller (not shown). The light source 415 is an embodiment of the light source 520 and the optical detectors 420 and 425 are embodiments of the optical detectors 530, 540, 550, and 560. Note that the controller can determine a change in position of the haptic plate 120 (not shown) using the optical sensor 500 with up to five degrees of freedom. If the controller also receives data from at least one optical sensor that that is oriented orthogonal (i.e., the optical sensors are in the same plane and parallel to the y-axis), the controller can determine a change in position of the haptic plate 120 in six degrees of freedom. In some embodiments, the controller is the haptic controller 190 of the haptic device 102 where the haptic controller 190 determines translation data.

In accordance with an embodiment, the optical detectors 530, 540, 550, and 560 are placed in relation to the light source 520 as follows. The optical detectors 530 and 540 are bisected by a first line A which is parallel to the y-axis and the optical detectors 530 and 540 are equidistant from the light source 520 but not collinear with the light source 520. The optical detectors 550 and 560 are bisected by a second line B which is also parallel to the y-axis, and the optical detectors 550 and 560 are equidistant from the light source 520. The first line A and the second line B are equidistant from the light source 520 along the x-axis. The optical detectors 530 and 550 are bisected by a third line A' which is parallel to the x-axis; the two optical detectors 530 and 550 are equidistant from the light source 520 but not collinear with the light source 520. The optical detectors 540 and 560 are bisected by a fourth line B' which is parallel to the x-axis and is distinct from the third line A'; the two optical detectors 540 and 560 are equidistant from the light source 520 but not collinear with the light source 520. The third line A' and the fourth line B' are equidistant from the light source 520 along the y-axis. In other embodiments, the optical sensor 500 comprises additional/fewer optical detectors. In other embodiments, the placement of the optical detectors can differ, e.g., instead of at the corners of a square, the plurality of optical detectors can be placed evenly in a circle.

The haptic plate 120 (not shown) can rotate about a rotational pivot. The rotational pivot is above the bottom plate 110 along the z-axis at the origin of the coordinate axes which is collated with the haptic plate (not shown). The rotation of the haptic plate 120 can occur with two degrees of freedom about the rotational pivot (x-axis and y-axis), in accordance with an embodiment. The optical detectors 530, 540, 550, and 560 work together to determine the rotation of the haptic plate 120. Similar to the operation of optical detectors 420 and 425 to measure the rotation of the haptic plate 120 in FIG. 4, the difference in light intensity of reflected light between that measured by the optical detectors 530 and 540 along line A and that measured by the optical detectors 550 and 560 along line B correspond to a rotation of the haptic plate 120 along the y-axis. Likewise the difference in light intensity of reflected light between that measured by the optical detectors 530 and 550 along line A' and that measured by the optical detectors 540 and 560 along line B' correspond to a rotation of the haptic plate 120 along the x-axis. The combination of the rotation along the x-axis and the rotation along the y-axis correspond to a rotation of the haptic plate 120 about the rotational pivot in two degrees of freedom.

A model maps light values at each of the plurality of optical detectors (e.g., the optical detectors 530, 540, 550, and 560) to specific positions of the haptic plate 120. Accordingly, the controller can use the model to determine a position of the haptic plate 120 given light measurements from the plurality of optical detectors. Moreover, the controller may determine a displacement of the haptic plate 120 from its previous position. In alternate embodiments, the controller may calculate on-the-fly (e.g., using a ray tracing algorithm) a displacement of the haptic plate 120 based in part on the light detected at each of the optical detectors.

Figure 6:
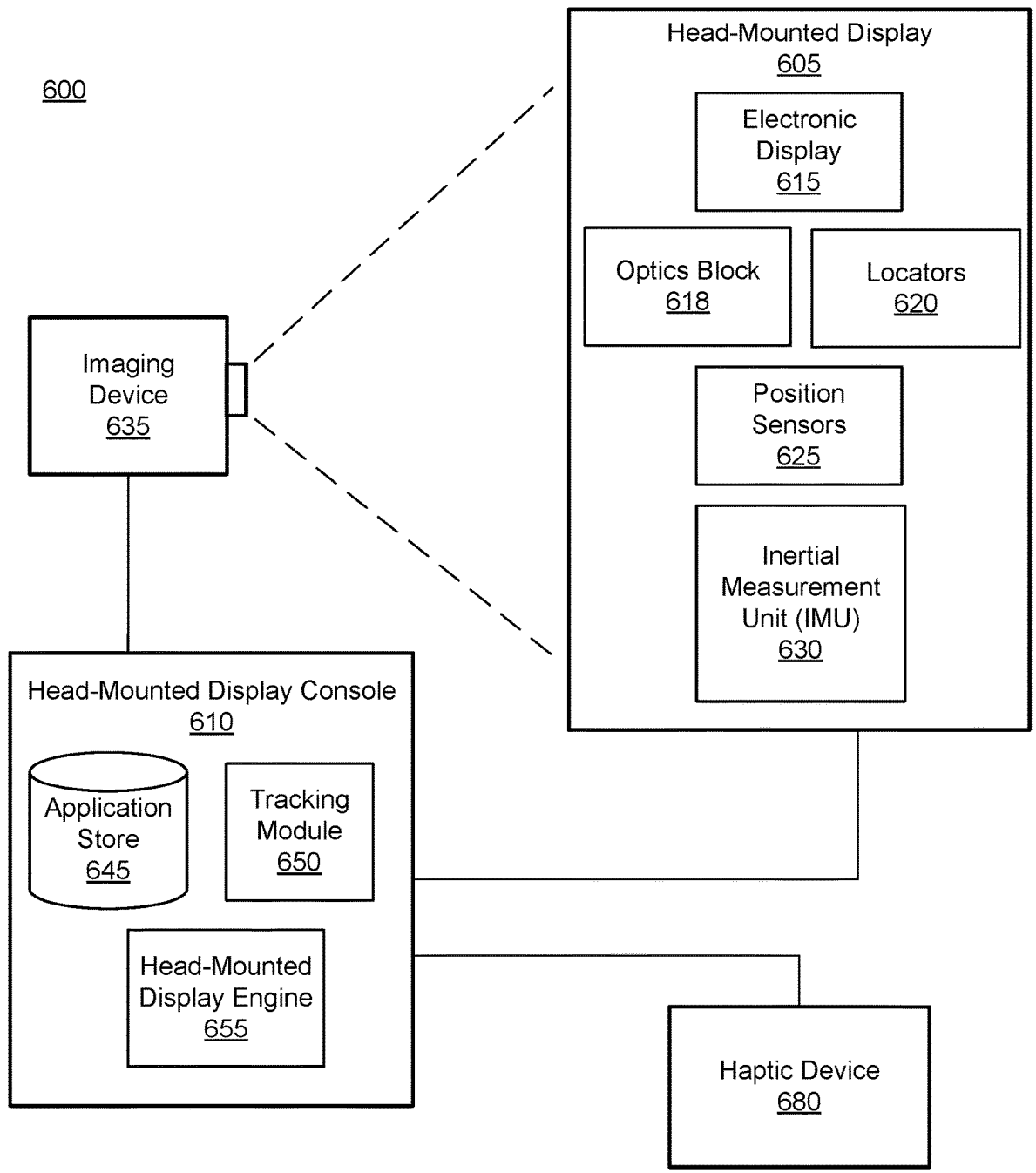
FIG. 6 is a block diagram of a HMD system in which a HMD console operates.

In one embodiment, the optical sensor 500 can be calibrated by measuring portions of the reflected light detected by each optical detector at a plurality of known positions (e.g., angles and/or distances up to three degrees of freedom: two rotational and one translational, between the haptic plate 120 and the plurality of optical detectors) of the haptic plate 120. The controller updates the model with values corresponding to the various amounts of detected light for each of the plurality of optical sensors at each of the different positions of the haptic plate 120. Example System Overview FIG. 6 is a block diagram of a HMD system 600 in which a HMD console 610 operates. The HMD system 600 may be for use as an artificial reality system. The HMD system 600 shown by FIG. 6 comprises a HMD 605, a HMD console 610, an imaging device 635, and a haptic device 680. While FIG. 6 shows an example system 600 including one HMD 605, one imaging device 635, and one haptic device 680 (e.g., a haptic device 102), in other embodiments any number of these components may be included in the HMD system 600. For example, there may be multiple HMD headsets 605 each having an associated haptic device 680 and being monitored by one or more imaging devices 635, with each HMD 605, haptic device 680, and imaging devices 635 communicating with the HMD console 610. In alternative configurations, different and/or additional components may be included in the system environment 600. Similarly, the functions can be distributed among the components in a different manner than is described here. For example, some or all of the functionality of the HMD console 610 may be contained within the HMD 605.

The HMD 605 may act as an artificial reality display. An MR and/or AR HMD augments views of a physical, real-world environment with computer-generated elements (e.g., images, video, sound, etc.). The HMD 605 presents content to a user. Example content includes images, video, audio, or some combination thereof. Audio content may be presented via a separate device (e.g., speakers and/or headphones) external to the HMD 605 that receives audio information from the HMD 605, the console 610, or both. The HMD 605 includes an electronic display 615, an optics block 618, one or more locators 620, one or more position sensors 625, and an IMU 630. The electronic display 615 displays images to the user in accordance with data received from the HMD console 610.

The optics block 618 magnifies received light from the electronic display 615, corrects optical errors associated with the image light, and the corrected image light is presented to a user of the HMD 605. An optical element may be an aperture, a Fresnel lens, a convex lens, a concave lens, a filter, or any other suitable optical element that affects the image light emitted from the electronic display 615. Moreover, the optics block 618 may include combinations of different optical elements. In some embodiments, one or more of the optical elements in the optics block 618 may have one or more coatings, such as anti-reflective coatings.

The locators 620 are objects located in specific positions on the HMD 605 relative to one another and relative to a specific reference point of the HMD 605. A locator 620 may be a light emitting diode (LED), a corner cube reflector, a reflective marker, a type of light source that contrasts with an environment in which the HMD 605 operates, or some combination thereof. In embodiments where the locators 620 are active (i.e., an LED or other type of light emitting device), the locators 620 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 620 are located beneath an outer surface of the HMD 605, which is transparent to the wavelengths of light emitted or reflected by the locators 620 or is thin enough not to substantially attenuate the wavelengths of light emitted or reflected by the locators 620. Additionally, in some embodiments, the outer surface or other portions of the HMD 605 are opaque in the visible band of wavelengths of light. Thus, the locators 620 may emit light in the IR band under an outer surface that is transparent in the IR band but opaque in the visible band.

The IMU 630 is an electronic device that generates IMU data of the HMD 605 based on measurement signals received from one or more of the position sensors 625. A position sensor 625 generates one or more measurement signals in response to motion of the HMD 605. Examples of position sensors 625 include: one or more accelerometers, one or more gyroscopes, one or more magnetometers, another suitable type of sensor that detects motion, a type of sensor used for error correction of the IMU 630, or some combination thereof. The position sensors 625 may be located external to the IMU 630, internal to the IMU 630, or some combination thereof.

Based on the one or more measurement signals from one or more position sensors 625, the IMU 630 generates IMU data of the HMD 605 indicating an estimated position of the HMD 605 relative to an initial position of the HMD 605. For example, the position sensors 625 include multiple accelerometers to measure translational motion (forward/back, up/down, left/right) and multiple gyroscopes to measure rotational motion (e.g., pitch, yaw, roll) of the HMD 605. In some embodiments, the IMU 630 rapidly samples the measurement signals and calculates the estimated position of the HMD 605 from the sampled data. For example, the IMU 630 integrates the measurement signals received from the accelerometers over time to estimate a velocity vector and integrates the velocity vector over time to determine an estimated position of a reference point of the HMD 605. Alternatively, the IMU 630 provides the sampled measurement signals to the HMD console 610, which determines the IMU data of the HMD 605. The reference point of the HMD 605 is a point that may be used to describe the position of the HMD 605. While the reference point of the HMD 605 may generally be defined as a point in space; however, in practice the reference point of the HMD 605 is defined as a point within the HMD 605 (e.g., a center of the IMU 630).

The haptic device 680 is an apparatus for providing haptic sensation to the user. The haptic device 680 receives, from the HMD console 610, haptic instructions corresponding to haptic sensation emulating a user experiencing a virtual haptic event. The haptic device 680 provides tactile perception through a haptic sensation sent to the user in accordance with the haptic instructions received from the HMD console 610. In an embodiment, the haptic device 680 is a haptic device 102 of FIG. 1 that receives the haptic instructions and provides the tactile perception to the user.

In another embodiment, the haptic instructions indicate a position or a portion of the haptic device 680 to be actuated, and an amount of actuation of the position or the portion of the haptic device 680 for providing haptic sensation. In this embodiment, the amount of actuation is determined by, e.g., the HMD console 610, according to a strength of a virtual haptic event in contact with the haptic device 680. The haptic device 680 provides tactile perception including a strength of a virtual impulse to a user at the position or portion of the haptic device 680 according to the amount of actuation indicated by the haptic instructions. In accordance to the embodiment shown in FIG. 1, the haptic instructions is received by the haptic device 102.

The haptic device 680 provides haptic sensation including a strength of a virtual haptic event in contact with a user. In one embodiment, the haptic device 680 is a haptic device 102 through which the HMD console 610 can provide tactile perception to the user's 105 feet by actuating the haptic device 102 on which the user 105 stands. Moreover, the haptic device 102 receives haptic instructions indicating the position or the portion to be actuated and the amount of actuation corresponding to the strength of a virtual haptic event.

The imaging device 635 generates imaging data in accordance with calibration parameters received from the HMD console 610. Imaging data (herein also referred to as "imaging information") of the HMD headset includes one or more images showing observed positions of the locators 620 associated with the HMD 605 that are detectable by the imaging device 635. In one aspect, the imaging data includes one or more images of the HMD 605. The imaging device 635 may include one or more cameras, one or more video cameras, any other device capable of capturing images including one or more of the locators 620, or any combination thereof. Additionally, the imaging device 635 may include one or more filters (e.g., used to increase signal to noise ratio). The imaging device 635 is configured to detect light emitted or reflected from locators 620 in a field of view of the imaging device 635. In embodiments where the locators 620 include passive elements (e.g., a retroreflector), the imaging device 635 may include a light source that illuminates some or all of the locators 620, which retro-reflect the light towards the light source in the imaging device 635. Imaging data is communicated from the imaging device 635 to the HMD console 610, and the imaging device 635 receives one or more calibration parameters from the HMD console 610 to adjust one or more imaging parameters (e.g., focal length, focus, frame rate, ISO, sensor temperature, shutter speed, aperture, etc.).

The HMD console 610 provides media to the HMD 605 for presentation to the user in accordance with information received from one or more of: the imaging device 635, the HMD 605, and the haptic device 680. The HMD console 610 may also instruct the haptic device 680 to provide haptic sensation including rigidity of a virtual object in contact with a user. In the example shown in FIG. 6, the HMD console 610 includes an application store 645, a tracking module 650, and a HMD engine 655. Some embodiments of the HMD console 610 have different modules than those described in conjunction with FIG. 6. Similarly, the functions further described below may be distributed among components of the HMD console 610 in a different manner than is described here.

The application store 645 stores one or more applications for execution by the HMD console 610. An application is a group of instructions, that when executed by a processor, generates content for presentation to the user. Content generated by an application may be in response to inputs received from the user via movement of the HMD 605. Content may also be in response to virtual events occurring in the virtual space. Examples of applications include gaming applications, conferencing applications, video playback application, or other suitable applications.

The tracking module 650 calibrates the HMD system 600 using one or more calibration parameters and may adjust one or more calibration parameters to reduce error in determination of the position of the HMD 605.

The tracking module 650 tracks movements of the HMD 605 using imaging information of the HMD 605 from the imaging device 635. The tracking module 650 determines positions of a reference point of the HMD 605 using observed locators from the imaging information and a model of the HMD 605. The tracking module 650 also determines positions of a reference point of the HMD 605 using position information from the IMU information of the HMD 605. Additionally, in some embodiments, the tracking module 650 may use portions of the IMU information, the imaging information, or some combination thereof of the HMD 605, to predict a future location of the headset 605. The tracking module 650 provides the estimated or predicted future position of the HMD 605 to the HMD engine 655.

The HMD engine 655 executes applications within the system environment 600 and receives position information, acceleration information, velocity information, predicted future positions, or some combination thereof of the HMD 605 from the tracking module 650. Based on the received information, the HMD engine 655 determines content to provide to the HMD 605 for presentation to the user. For example, if the received information indicates that the user has looked to the left, the HMD engine 655 generates content for the HMD 605 that mirrors the user's movement in a virtual environment. Additionally, the HMD engine 655 performs an action within an application executing on the HMD console 610 in response to detecting a motion of the haptic device 680 and provides feedback to the user that the action was performed. In one example, the HMD engine 655 instructs the HMD 605 to provide visual or audible feedback to the user. In another example, the HMD engine 655 instructs the haptic device 680 to provide haptic sensation.

In one embodiment, the HMD engine 655 generates haptic instructions in responsive to the strength of a virtual haptic event detected. Responsive to detecting the virtual haptic event, the HMD engine 655 determines a strength of the virtual haptic event in contact with the user. In one aspect, the haptic instructions indicate which portion (e.g., a coordinate or a position) of the haptic device 680 to provide haptic sensation and the strength of the virtual haptic event. The HMD engine 655 obtains the predetermined strength corresponding to the virtual haptic event from the application store 645. For example, the HMD engine 655 determines which virtual haptic event is in contact with the user (e.g., an earthquake, a pillow hit, a stampede, etc.) and obtains the strength corresponding to the determined virtual haptic event from the application store 645. Moreover, the HMD engine 655 determines which part of the haptic device 680 is in contact (e.g., an index finger or a foot), and generates the haptic instructions accordingly. In another aspect, the HMD engine 655 determines an amount of actuation corresponding to the strength, and generates the haptic instructions indicating the determined amount of actuation instead of the strength level. The HMD engine 655 provides the haptic instructions to the haptic device 680 for executing the haptic sensation. In accordance with an embodiment, the haptic controller 190 of FIG. 1 receives the haptic instructions indicating the coordinate of the haptic device 102 to provide haptic sensation and a desired waveform or strength. The haptic controller 190 sends an actuation signal to one or more actuators 150 corresponding to the indicated position/portion to be actuated and the degree of bending resistance. The one or more actuators 150 provide the haptic sensation by generating a haptic wave 180.

Figure 7:
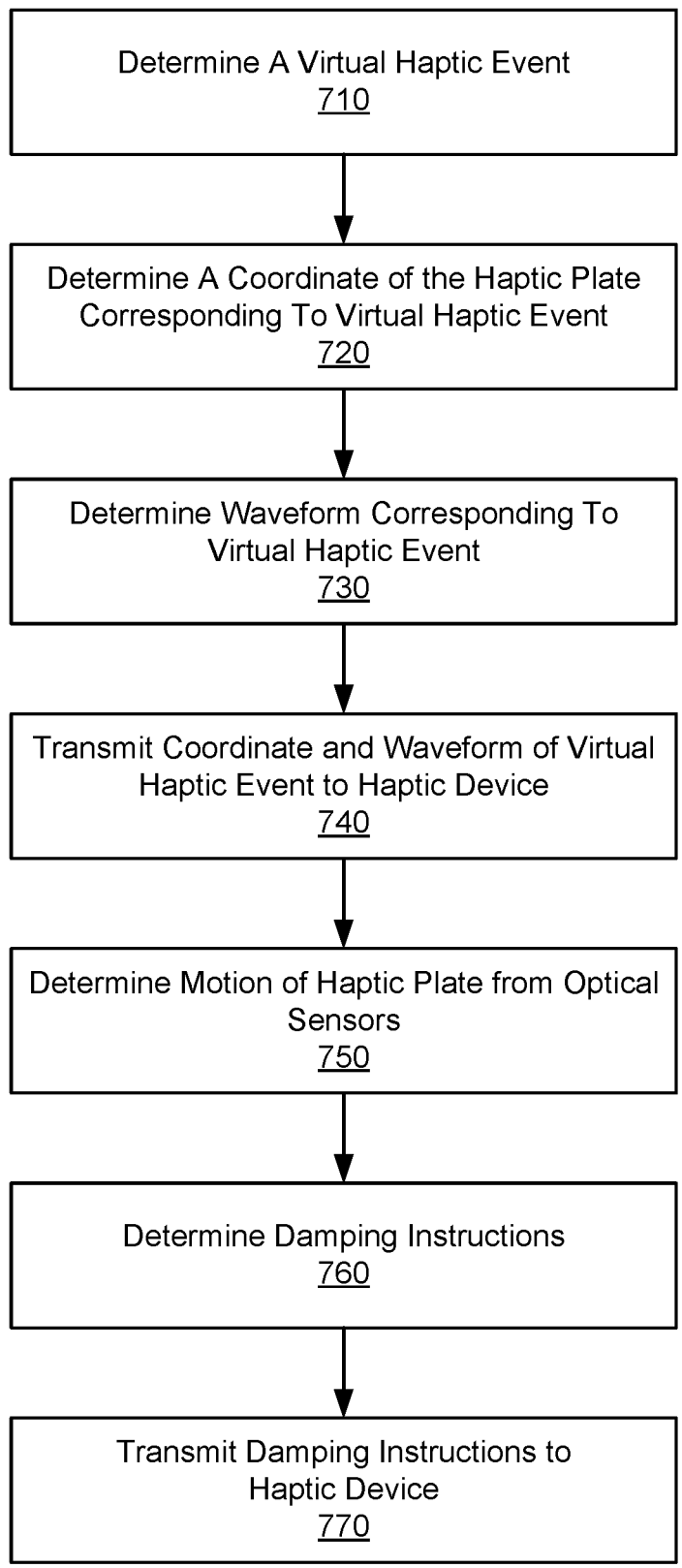
FIG. 7 is a flowchart illustrating a process of providing haptic sensation responsive to a virtual haptic event in a virtual space, in accordance with an embodiment.

FIG. 7 is a flowchart illustrating a process 700 of providing haptic sensation responsive to a virtual haptic event in a virtual space, in accordance with an embodiment. In one embodiment, the process of FIG. 7 is performed by a console (e.g., HMD console 610 of FIG. 6). Other entities may perform some or all of the steps of the process in other embodiments. Likewise, embodiments may include different and/or additional steps, or perform the steps in different order.

The console 710 determines a virtual haptic event. In one embodiment, the console receives IMU data from the headset (e.g., the HMD 605 of FIG. 6) and/or imaging data from the imaging device (e.g., the imaging device 635 of FIG. 6), and then determines haptic sensation to the haptic device (e.g., the haptic device 102 of FIG. 1). In one approach, the console obtains 3-D map of the virtual landscape where the user is within the artificial reality experience. The console compares the coordinates of a virtual event in the virtual space and the coordinates of the user in the virtual space to determine whether a virtual haptic event to the user has occurred.

Responsive to determining the virtual haptic event occurred, the console 720 determines a coordinate of the haptic plate corresponding to the virtual haptic event. For example, responsive to the user experiencing an earthquake with an epicenter 2 miles away in a virtual space, the console determines that a virtual haptic event occurred, and identifies a portion of the haptic device corresponding to where the user is standing to be actuated with haptic sensation.

The console 730 determines a waveform corresponding to the virtual haptic event. The waveform of the haptic wave to be perceived by the user can be obtained from a database of waveforms given various virtual haptic events (e.g., via a look-up table). Continuing on the above example, the console determines a waveform for an earthquake (e.g., '35' out of '100' in magnitude with a frequency of '10' out of '100' as haptic sensation for the magnitude seven earthquake on the Richter scale in the virtual space, where magnitude '100' indicates the highest magnitude that can be actuated by the haptic device and frequency '100' indicates the biggest frequency that can be actuated by the haptic device).

The console 740 transmits a set of haptic instructions to the haptic device describing details of the haptic sensation to be provided, according to the determined waveform and coordinate. In one embodiment, the haptic instructions indicate which actuators should be actuated with a specific waveform and a specific timing.

The console 750 determines a displacement of the haptic plate from optical sensors coupled to the haptic plate. In one embodiment, the optical sensors determine the displacement of the haptic plate and relay that information to the console. In another embodiment, the console receives data from the optical sensors and calculates the displacement of the haptic plate.

The console 760 determines damping instructions. To avoid reflection of haptic waves generated, the haptic device needs to dampen any stray vibrations appropriately. In one embodiment, a magnitude of damping is determined in part by the displacement of the haptic plate as determined by the console. In one embodiment, the console 760 also determines which actuators on the haptic plate to configure into a damping configuration. In another embodiment, the console 760 also determines the timing precision of the actuators that are configured to dampen stray vibrational energy.

The console 770 transmits the damping instructions to the haptic device describing details regarding damping. In one embodiment, the console 770 transmits damping instructions concerning the actuators on the haptic device to be utilized in damping. In another embodiment, the console 770 transmits damping instructions inclusive of the timing precision of the actuators to dampen at precise times.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
   instructing a light source to illuminate a surface of a haptic plate;
   receiving light measurements detected by a first optical detector and a second optical detector, the light measurements corresponding to an amount of light reflected from the surface of the haptic plate and detected by the first optical detector and an amount of light reflected from the surface of the haptic plate and detected by the second optical detector; and
   determining, by a controller, a displacement of the haptic plate based on the light measurements.

2. The method of claim 1, wherein determining, by the controller, the displacement of the haptic plate based on the light measurements comprises:
   applying, by the controller, a model to the light measurements to determine a current position of the haptic plate, wherein the model maps a range of positions of the haptic plate to light measurements; and
   determining, by the controller, the displacement of the haptic plate as a difference between a previous position of the haptic plate and the current position of the haptic plate.

3. The method of claim 2, wherein the model is generated by:
   instructing a light source to illuminate the surface of the haptic plate;
   receiving light measurements detected by the first optical detector and the second optical detector over a range of positions of the haptic plate; and
   generating the model by mapping the light measurements over the range of positions of the haptic plate.

4. The method of claim 3, wherein the range of positions of the haptic plate is a combination of a range of vertical displacements of the haptic plate and a range of rotations of the haptic plate.

5. The method of claim 1, wherein the light source emits at least a first light ray, and wherein determining, by the controller, the displacement of the haptic plate based on the light measurements comprises:
   identifying, by the controller, a position on the first optical detector or the second optical detector that detected the first light ray reflected from the surface of the haptic plate based on the light measurements; and
   determining, by the controller, the displacement of the haptic plate by tracing a path of the first light ray from the light source to the position on the first optical detector or the second optical detector.

6. The method of claim 1, wherein the light source is instructed to emit infrared light, and the light measurements received from the first optical detector and the second optical detector correspond to an amount of infrared light detected by the first optical detector and the second optical detector.

7. The method of claim 1, wherein the light source is instructed to emit visible light, and the light measurements received from the first optical detector and the second optical detector correspond to an amount of visible light detected by the first optical detector and the second optical detector.

8. The method of claim 1, further comprising:
   receiving additional light measurements from a third optical detector and a fourth optical detector, the additional light measurements corresponding to an amount of light reflected from the surface of the haptic plate and detected by the third optical detector and an amount of light reflected from the surface of the haptic plate and detected by the fourth optical detector, and
   wherein determining, by the controller, the displacement is further based on the additional light measurements.

9. The method of claim 1,
   wherein the first optical detector, the second optical detector, the third optical detector, and the fourth optical detector are positioned equidistant to the light source,
   wherein the first optical detector and the second optical detector are centered along a first axis that bisects the light source,
   wherein the third optical detector and the fourth optical detector are centered along a second axis that also bisects the light source, and
   wherein the first axis is orthogonal to the second axis.

10. The method of claim 1, further comprising:
    instructing one or more actuators coupled to the haptic plate to generate a damping response, wherein the damping response is based on the determined displacement of the haptic plate.

11. A non-transitory computer-readable storage medium storing instructions that, when executed by a processor, cause the process to perform operations comprising:
    instructing a light source to illuminate a surface of a haptic plate;
    receiving light measurements detected by a first optical detector and a second optical detector, the light measurements corresponding to an amount of light reflected from the surface of the haptic plate and detected by the first optical detector and an amount of light reflected from the surface of the haptic plate and detected by the second optical detector; and
    determining, by a controller, a displacement of the haptic plate based on the light measurements.

12. The non-transitory computer-readable storage medium of claim 11, wherein determining, by the controller, the displacement of the haptic plate based on the light measurements comprises:
    applying, by the controller, a model to the light measurements to determine a current position of the haptic plate, wherein the model maps a range of positions of the haptic plate to light measurements; and
    determining, by the controller, the displacement of the haptic plate as a difference between a previous position of the haptic plate and the current position of the haptic plate.

13. The non-transitory computer-readable storage medium of claim 12, wherein the model is generated by:
    instructing a light source to illuminate the surface of the haptic plate;
    receiving light measurements detected by the first optical detector and the second optical detector over a range of positions of the haptic plate; and
    generating the model by mapping the light measurements over the range of positions of the haptic plate.

14. The non-transitory computer-readable storage medium of claim 13, wherein the range of positions of the haptic plate is a combination of a range of vertical displacements of the haptic plate and a range of rotations of the haptic plate.

15. The non-transitory computer-readable storage medium of claim 11, wherein the light source emits at least a first light ray, and wherein determining, by the controller, the displacement of the haptic plate based on the light measurements comprises:

identifying, by the controller, a position on the first optical detector or the second optical detector that detected the first light ray reflected from the surface of the haptic plate based on the light measurements; and determining, by the controller, the displacement of the haptic plate by tracing a path of the first light ray from the light source to the position on the first optical detector or the second optical detector.

16. The non-transitory computer-readable storage medium of claim 11, wherein the light source is instructed to emit infrared light, and the light measurements received from the first optical detector and the second optical detector correspond to an amount of infrared light detected by the first optical detector and the second optical detector.

17. The non-transitory computer-readable storage medium of claim 11, wherein the light source is instructed to emit visible light, and the light measurements received from the first optical detector and the second optical detector correspond to an amount of visible light detected by the first optical detector and the second optical detector.

18. The non-transitory computer-readable storage medium of claim 11, the operations further comprising:

receiving additional light measurements from a third optical detector and a fourth optical detector, the additional light measurements corresponding to an amount of light reflected from the surface of the haptic plate and detected by the third optical detector and an amount of light reflected from the surface of the haptic plate and detected by the fourth optical detector, and wherein determining, by the controller, the displacement is further based on the additional light measurements.

19. The non-transitory computer-readable storage medium of claim 11, wherein the first optical detector, the second optical detector, the third optical detector, and the fourth optical detector are positioned equidistant to the light source, wherein the first optical detector and the second optical detector are centered along a first axis that bisects the light source, wherein the third optical detector and the fourth optical detector are centered along a second axis that also bisects the light source, and wherein the first axis is orthogonal to the second axis.

20. The non-transitory computer-readable storage medium of claim 11, the operations further comprising:

instructing one or more actuators coupled to the haptic plate to generate a damping response, wherein the damping response is based on the determined displacement of the haptic plate.

* * * * *